(12) United States Patent
Bahrami et al.

(10) Patent No.: US 10,853,150 B1
(45) Date of Patent: Dec. 1, 2020

(54) GENERATING APPLICATION PROGRAMMING INTERFACE KNOWLEDGE GRAPHS

(71) Applicant: FUJITSU LIMITED, Kawasaki (JP)

(72) Inventors: Mehdi Bahrami, Santa Clara, CA (US); Wei-Peng Chen, Fremont, CA (US)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/732,239

(22) Filed: Dec. 31, 2019

(51) Int. Cl.
*G06F 9/54* (2006.01)
*G06F 16/36* (2019.01)

(52) U.S. Cl.
CPC ............ *G06F 9/541* (2013.01); *G06F 9/547* (2013.01); *G06F 16/367* (2019.01)

(58) Field of Classification Search
CPC .............................. G06F 16/367; G06F 9/541
See application file for complete search history.

(56) References Cited

U.S. PATENT DOCUMENTS

| | | | |
|---|---|---|---|
| 9,396,046 B2 | 7/2016 | Laredo et al. | |
| 10,042,836 B1* | 8/2018 | Wang | G06F 16/9024 |
| 10,116,725 B2 | 10/2018 | Wells et al. | |
| 2011/0271176 A1* | 11/2011 | Menday | G06F 16/367 715/234 |
| 2013/0238667 A1* | 9/2013 | Carvalho | G06F 16/27 707/798 |
| 2016/0026710 A1* | 1/2016 | Laredo | G06F 16/3334 707/748 |
| 2018/0165135 A1* | 6/2018 | Bahrami | G06F 9/541 |
| 2018/0196643 A1* | 7/2018 | Dolby | G06F 8/36 |
| 2019/0197111 A1* | 6/2019 | Garrote | G06F 40/30 |
| 2020/0192727 A1* | 6/2020 | Savenkov | G06F 9/541 |

* cited by examiner

*Primary Examiner* — Brian W Wathen
(74) *Attorney, Agent, or Firm* — Maschoff Brennan (57) ABSTRACT

A method may include obtaining first API documentation associated with a first API and second API documentation associated with a second API. The method may include mining the first API documentation to extract a first plurality of semantic triples and mining the second API documentation to extract a second plurality of semantic triples. The method may include selecting a first subset of semantic triples from the first plurality of semantic triples and a second subset of semantic triples from the second plurality of semantic triples. The method may include generating a first ontology based on the first API documentation and the first subset of semantic triples. The method may include generating a second ontology. The method may include correlating the first ontology with the second ontology. The method may include generating a knowledge graph of the first API and the second API.

17 Claims, 7 Drawing Sheets

GENERATING APPLICATION PROGRAMMING INTERFACE KNOWLEDGE GRAPHS

FIELD

The embodiments discussed in the present disclosure are related to generating application programming interface knowledge graphs.

BACKGROUND

Application programming interface (API) documentation may include instructions for software developers on how to use the API and/or interact with the API. However, there may be inconsistencies between different APIs as each API provider may use its own terminology and information structure, making it difficult for software developers to understand different APIs.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

A method may include obtaining first application programming interface (API) documentation associated with a first API and second API documentation associated with a second API. The method may include mining the first API documentation to extract a first plurality of semantic triples and mining the second API documentation to extract a second plurality of semantic triples. The method may include selecting a first subset of semantic triples from the first plurality of semantic triples and a second subset of semantic triples from the second plurality of semantic triples. The method may include generating a first ontology based on the first API documentation and the first subset of semantic triples. The first ontology may include one or more first concepts associated with the first API, one or more first attributes associated with the one or more first concepts, and one or more first taxonomical relationships between the one or more first concepts. The method may include generating a second ontology based on the second API documentation and the second subset of semantic triples. The second ontology may include one or more second concepts associated with the second API, one or more second attributes associated with the one or more second concepts, and one or more second taxonomical relationships between the one or more second concepts. The method may include correlating the first ontology with the second ontology based on the one or more first concepts of the first ontology and the one or more second concepts of the second ontology. The method may include generating a knowledge graph of the first API and the second API based on the first ontology, the second ontology, and the correlating the first ontology with the second ontology.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described in the present disclosure relate to methods and systems of generating application programming interface (API) knowledge graphs. APIs may be used to allow different machines to interact with each other and with software applications without exposing the source code or how the API internally works to others. Each API may have its own definition of methods, parameters, attributes, input/output data types, and descriptions of each of these. Thus, it may be difficult for a software developer to use an API without guidance on how to use it, what methods the API provides, and what input/output the API expects and/or produces.

API documentation may provide instructions to a software developer to help the developer learn how to interact with the API. However, each provider of an API may use different terminologies even when referencing similar and/or identical objects, functions, and/or processes. Additionally, even if two different API producers use a similar terminology within the API, the producers may describe the functioning, features, data structures, among other things, differently in API documentation. Furthermore, the information beneficial to understand different APIs may be presented in an unstructured and/or semi-structured manner in API documentation, further making it difficult to compare and/or analogize between different APIs. Thus, it may be difficult for software developers, even senior software developers to understand different APIs and how the structure of one API relates to the structure of another API.

Various embodiments of the present disclosure may help to generate a knowledge graph of two or more APIs. Systems and/or processes of the present disclosure may allow the creation of a knowledge graph by transferring unstructured, semi-structured, and structured information of API documentations into a structured format. In some embodiments, multiple API documentations (dozens, hundreds, thousands, or more) may be combined to generate a knowledge graph associated with the APIs of multiple different API providers. The knowledge graph may correspond to the API description and may facilitate the identification of information that is not contained in a single API such as the relationships between functions, structures, and/or objects in different APIs. For example, the knowledge graph may help a user understand that different terminologies of different APIs correspond to the same things. For example, one API provider may refer to an API representational state transfer (REST) endpoint as an "endpoint" while another API provider may refer to an API REST endpoint as a "function." The knowledge graph may link the "endpoint" of one API with the "function" of another API to allow users to more easily use both APIs.

In some embodiments, knowledge graphs produced according to methods of the present disclosure may be searched to identify responses to user queries regarding different APIs. For example, using a knowledge graph, a user's query may be obtained in a natural language (e.g., English or Japanese)

Various embodiments of the present disclosure may result in the generation of knowledge graphs which may reduce the cost and/or the time required to develop new code to interact with APIs.

Embodiments of the present disclosure are explained with reference to the accompanying drawings.

Figure 1:
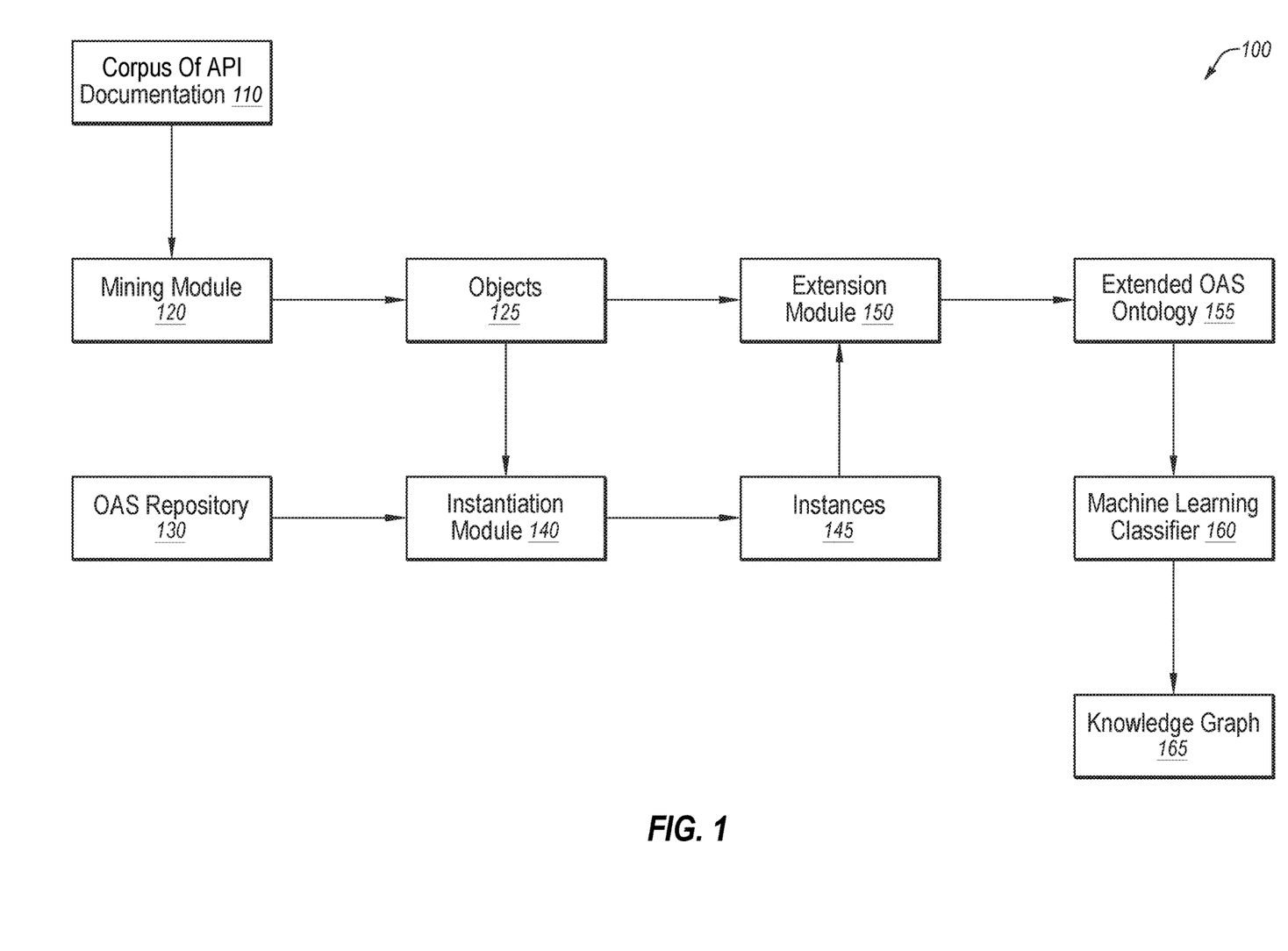
FIG. 1 is a diagram representing an example environment related to generating application programming interface (API) knowledge graphs.

FIG. 1 is a diagram representing an example environment 100 related to generating API knowledge graphs, arranged in accordance with at least one embodiment described in the present disclosure. The environment 100 may include a mining module 120, an instantiation module 140, an extension module 150, and a machine learning classifier 160.

The mining module 120 may include code and routines configured to enable a computing device to perform one or more operations with respect to a corpus of API documentation 110 to obtain objects 125. Additionally or alternatively, the mining module 120 may be implemented using hardware including a processor, a microprocessor (e.g., to perform or control performance of one or more operations), a field-programmable gate array (FPGA), or an application-specific integrated circuit (ASIC). In some other instances, the mining module 120 may be implemented using a combination of hardware and software. In the present disclosure, operations described as being performed by the mining module 120 may include operations that the mining module 120 may direct a corresponding system to perform.

In some embodiments, the mining module 120 may obtain a corpus of API documentation 110. In some embodiments, the mining module 120 may obtain the corpus of API documentation 110 via one or more networks. In some embodiments, the corpus of API documentation 110 may include API documentation associated with multiple APIs. For example, the corpus of API documentation 110 may include API documentation associated with ten, one hundred, one thousand, ten thousand, or any number of APIs. The APIs may be REST APIs, Java™ APIs, or any other type of API. In some embodiments, multiple API documentation of the corpus of API documentation 110 may be associated with a particular API. For example, a particular API may have ten API documentation associated with it and another API may have one API documentation associated with it. Each API documentation may include instructions to a software developer to help the developer learn how to interact with the API and may use language that a provider of the API has chosen. Different API documentation may use different terminology even when referencing the same or similar objects, functions, concepts, processes, ideas, and/or structures.

The mining module 120 may then "mine" the API documentation of the corpus of API documentation 110. In some embodiments, mining the API documentation may include extracting triples from the API documentation. In some embodiments, a triple may include a Resource Description Framework (RDF) triple. A triple may include a subject, a predicate, and an object. The mining module 120 may extract triples from the API documentation through multiple different processes. For example, in some embodiments, the API documentation may be manually annotated for triple extraction and there may be handling conditions for triples. In some embodiments, the mining module 120 may tokenize the API documentation. Tokenization may refer to breaking a stream of text, such as a sentence, into words, phrases, symbols, or other meaningful elements called tokens. The mining module 120 may then parse the tokenized API documentation to extract elements from the sentences of the API documentation. In some embodiments, each parsed token may include one or more elements. For example, each parsed token may be used to generate three elements that may be stored as a triple. For example, the mining module 120 may use extraction rules to extract the three elements of a triple, the subject, predicate, and object, from each sentence. For example, the triples may be in the format of <API, title, API1>, <API, title, API2>, among other formats. After the mining module 120 extracts the triples from each API documentation for each API from the corpus of API documentation 110, the mining module 120 may select a subset of the triples associated with each API. For example, in some embodiments, the mining module 120 may identify how frequently a predicate appears across all API documentation. If the frequency of appearance of a predicate in a particular triple satisfies a threshold, the particular triple may be selected as a triple in the subset of triples.

In some embodiments, the mining module 120 may determine the percentage of API documentations of the corpus of API documentation 110 in which each predicate in each triple occurs. For example, a particular predicate may appear in 82% of the API documentations of the corpus of API documentation 110. If the threshold occurrence rate is 80%, triples including the particular predicate may be included in the subset of triples. In some embodiments, the subset of triples may be the objects 125. Alternatively or additionally, in some embodiments, the mining module 120 may employ an unsupervised machine learning algorithm such as a Word2Vec algorithm on the corpus of API documentation 110 to identify similarity between words. Based on the similarities between words, the mining module 120 may identify particular words in the corpus of API documentation 110 as the objects 125.

The instantiation module 140 may include code and routines configured to enable a computing device to perform one or more operations with respect to an OAS repository 130 and the objects 125 to obtain instances 145. Additionally or alternatively, the instantiation module 140 may be implemented using hardware including a processor, a microprocessor (e.g., to perform or control performance of one or more operations), a field-programmable gate array (FPGA), or an application-specific integrated circuit (ASIC). In some other instances, the instantiation module 140 may be implemented using a combination of hardware and software. In the present disclosure, operations described as being performed by the instantiation module 140 may include operations that the instantiation module 140 may direct a corresponding system to perform.

In some embodiments, the instances 145 may include samples and/or examples of the objects 125. For example, one object 125 may include an "endpoint address." In these and other embodiments, the instantiation module 140 may obtain "/post_message" as an instance of the "endpoint address" object. In some embodiments, the instantiation module 140 may generate the instances 145 from the objects 125 based on the OAS repository 130. In some embodiments, the OAS repository 130 may include multiple OAS JavaScript Object Notation (JSON) files. Each OAS JSON file may be a machine-readable file. The OAS JSON file may include multiple values and each value may be an instance of the object name. For example, the OAS JSON file may include "paths"→'/post_message' which may be addressed as:

"paths" as an endpoint (according to the OAS format) and the value or instance may be "/post_message." Different OAS JSON files may correspond to different APIs. For example, a first API may be associated with a first OAS JSON file and/or a first set of OAS JSON files. A second API may be associated with a second OAS JSON file and/or a second set of OAS JSON files. Alternatively or additionally, in some embodiments, an API may not include or be associated with a corresponding OAS file. In these and other embodiments, an API documentation of the corpus of API documentation 110 may be parsed to construct an OAS. In some embodiments, the OAS JSON files in the OAS repository 130 may conform to a standard OAS schema such as the standard specified by the Open API Specification. In these and other embodiments, there may be different versions of OAS schema. For example, one OAS JSON file may be an OAS 3.0.0 version file and another OAS JSON file may be an OAS 3.0.1 version file. In some embodiments, the OAS repository 130 may be associated with web-based APIs and may not be associated with APIs that are not web-based. In some embodiments, the OAS schema may be a standard for REST APIs and may define a structure to arrange objects and values. In some embodiments, an OAS may correspond with an ontology. For example, the ontology may include a data model that describes concepts, attributes of the concepts, and hierarchical relationships among the concepts.

The extension module 150 may include code and routines configured to enable a computing device to perform one or more operations with respect to the objects 125 and the instances 145 to obtain an extended OAS ontology 155. Additionally or alternatively, the extension module 150 may be implemented using hardware including a processor, a microprocessor (e.g., to perform or control performance of one or more operations), a field-programmable gate array (FPGA), or an application-specific integrated circuit (ASIC). In some other instances, the extension module 150 may be implemented using a combination of hardware and software. In the present disclosure, operations described as being performed by the extension module 150 may include operations that the extension module 150 may direct a corresponding system to perform.

In some embodiments, the extension module 150 may start with the open API specification associated with a particular API as the ontology. The extension module 150 may extend the ontology by adding the objects 125 and the instances 145 to the ontology. In some embodiments, the extension module 150 may modify the ontology in different manners depending on the class, properties, and data types of the ontology. For example, with properties with well-defined ranges, path item objects may be added to the ontology. For example, a node may be added for each property in the object. Alternatively or additionally, for patterned properties without specified ranges such as, for example, self-defined properties and extensible properties, the extension module 150 may add the properties as new properties of a root class.

As an example, some field patterns may allow the extension of a class to another schema such as the Swagger schema. For example, in some embodiments, the field pattern ^x- may allow extensions to the Swagger schema. Thus, x-internal-id may allow an API to access "internal-id" from the Swagger schema and x-origin may allow an API to access "origin" from the Swagger schema. The extension module 150 may thus extend an ontology using instances 145 and objects 125 obtained from the instantiation module 140 and the mining module 120, respectively, to obtain the extended OAS ontology 155. Additionally or alternatively, the extension module 150 may extend an ontology based on patterned properties with extensible properties to include new properties to obtain the extended OAS ontology 155. Alternatively or additionally, the extension module 150 may extend an ontology using the instances 145, the objects 125, and patterned properties with extensible properties to obtain the extended OAS ontology 155.

For example, the extension module 150 may infer a class associated with each instance 145 based on an OAS from the OAS repository. For example, the extension module 150 may compare field names, parameters, and attributes to determine that a particular object is an instance of an "operation object." Analogously, the extension module 150 may determine that a particular object is an instance of a parameter object or any other type of object.

Additionally or alternatively, in some embodiments, the extension module 150 may define new classes and add the new classes to generate the extended OAS ontology 155. For example, the extension module 150 may define ScopesRange as a new class and SecurityRequirementRange as a new class. For example, in some embodiments, the extension module 150 may create additional properties as nodes as described above. These self-defined properties and/or classes may not have classes assigned to them. In some embodiments, the extension module 150 may also modify classes to add additional properties to the classes. For example, the extension module 150 may add new properties "XXXItem" and "itemName" properties to PathsObject, HeadersObject, DefinitionsObject, ParametersDefinitionsObject, ResponsesDefinitionsObject, SecurityDefinitionsObject, and SchemaObject classes. In these and other embodiments, "XXX" in "XXXItem" may represent "path" (of "PathsObject"), "header" (of "HeadersObject"), etc. In these and other embodiments, adding the additional properties may reduce redundancy. Thus, in some embodiments, the extension module 150 may generate additional nodes in a knowledge graph or ontology. In some embodiments, the extension module 150 may alter self-defined properties that do not conform to naming rules of RDFs. For example, if a property begins with a number, it may be modified to begin with an underscore, "200" may be modified to "_200". Similarly, parentheses may be modified to underscores, "category(primary)" may be modified to "category_primary_".

The machine learning classifier 160 may include code and routines configured to enable a computing device to perform one or more operations with respect to one or more extended OAS ontologies 155 to obtain a knowledge graph 165. Additionally or alternatively, the machine learning classifier 160 may be implemented using hardware including a processor, a microprocessor (e.g., to perform or control performance of one or more operations), a field-programmable gate array (FPGA), or an application-specific integrated circuit (ASIC). In some other instances, the machine learning classifier 160 may be implemented using a combination of hardware and software. In the present disclosure, operations described as being performed by the machine learning classifier 160 may include operations that the machine learning classifier 160 may direct a corresponding system to perform.

In some embodiments, the machine learning classifier 160 may be configured to generate a knowledge graph 165 from one or more extended OAS ontologies 155. The machine learning classifier 160 may generate a graph based on the extended OAS ontology 155 including its related objects 125 and instances 145.

Figure 2A:
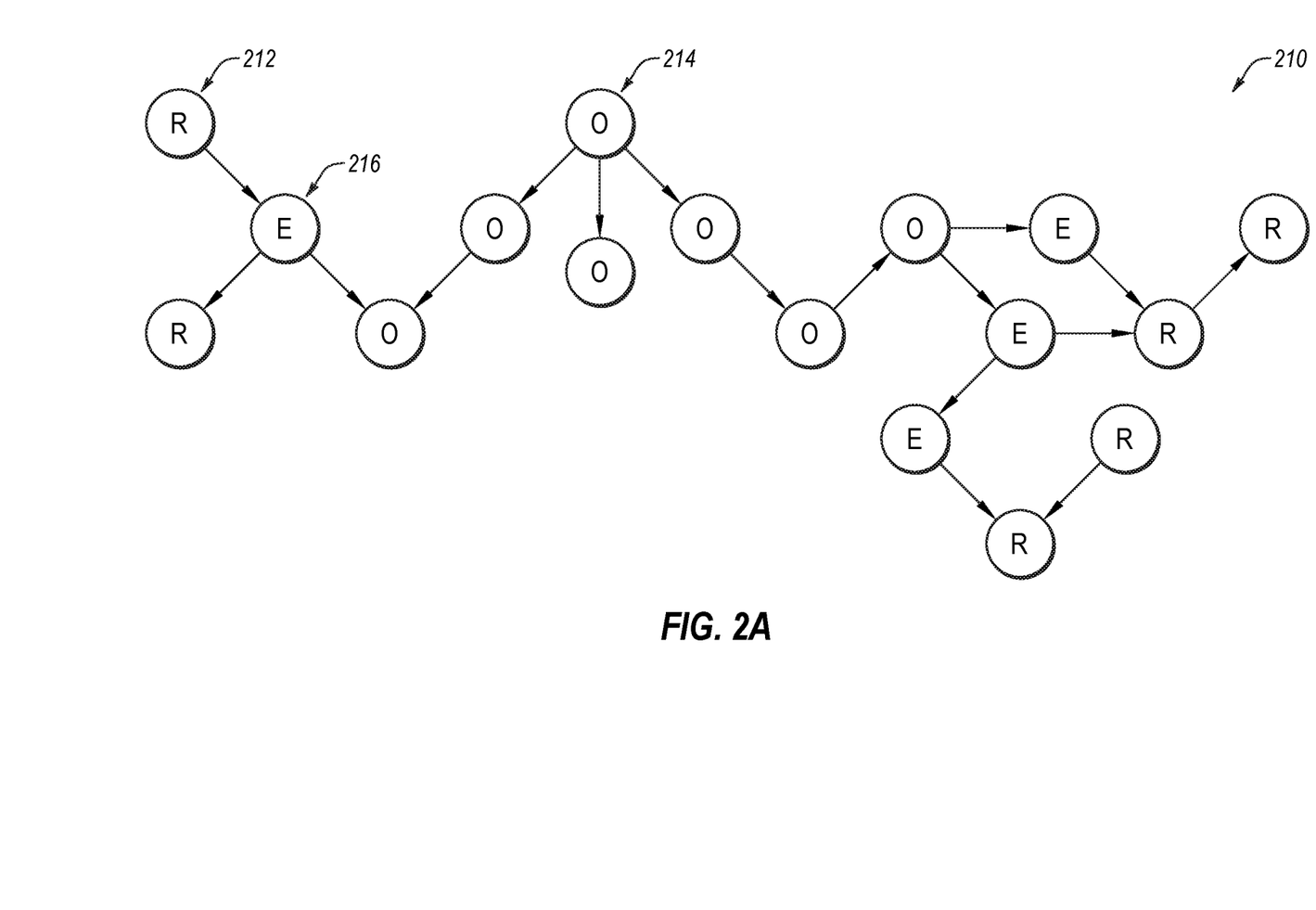
FIGS. 2a-2c illustrate example API knowledge graphs and/or snippets of API knowledge graphs.
Figure 2B:
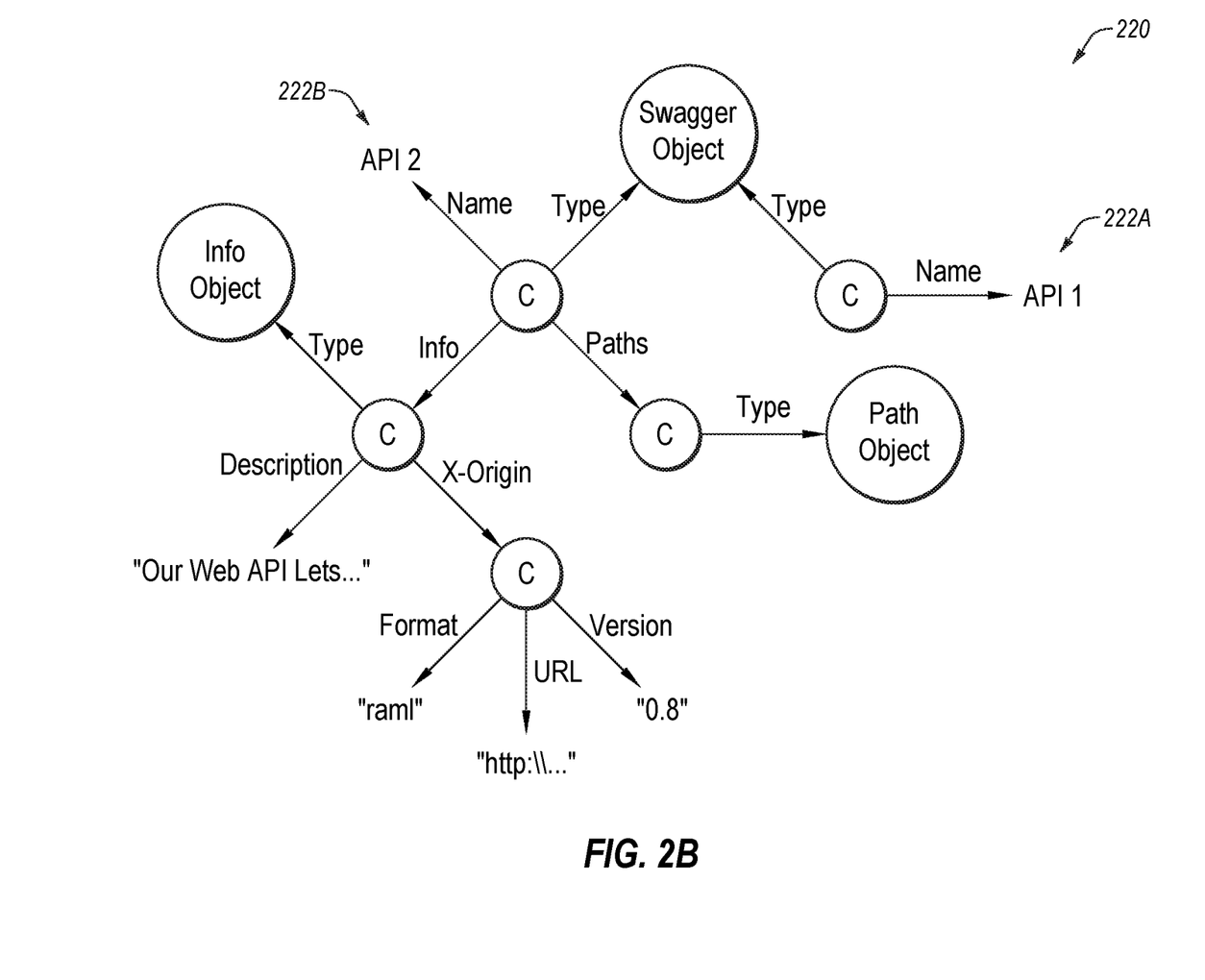
Figure 2C:
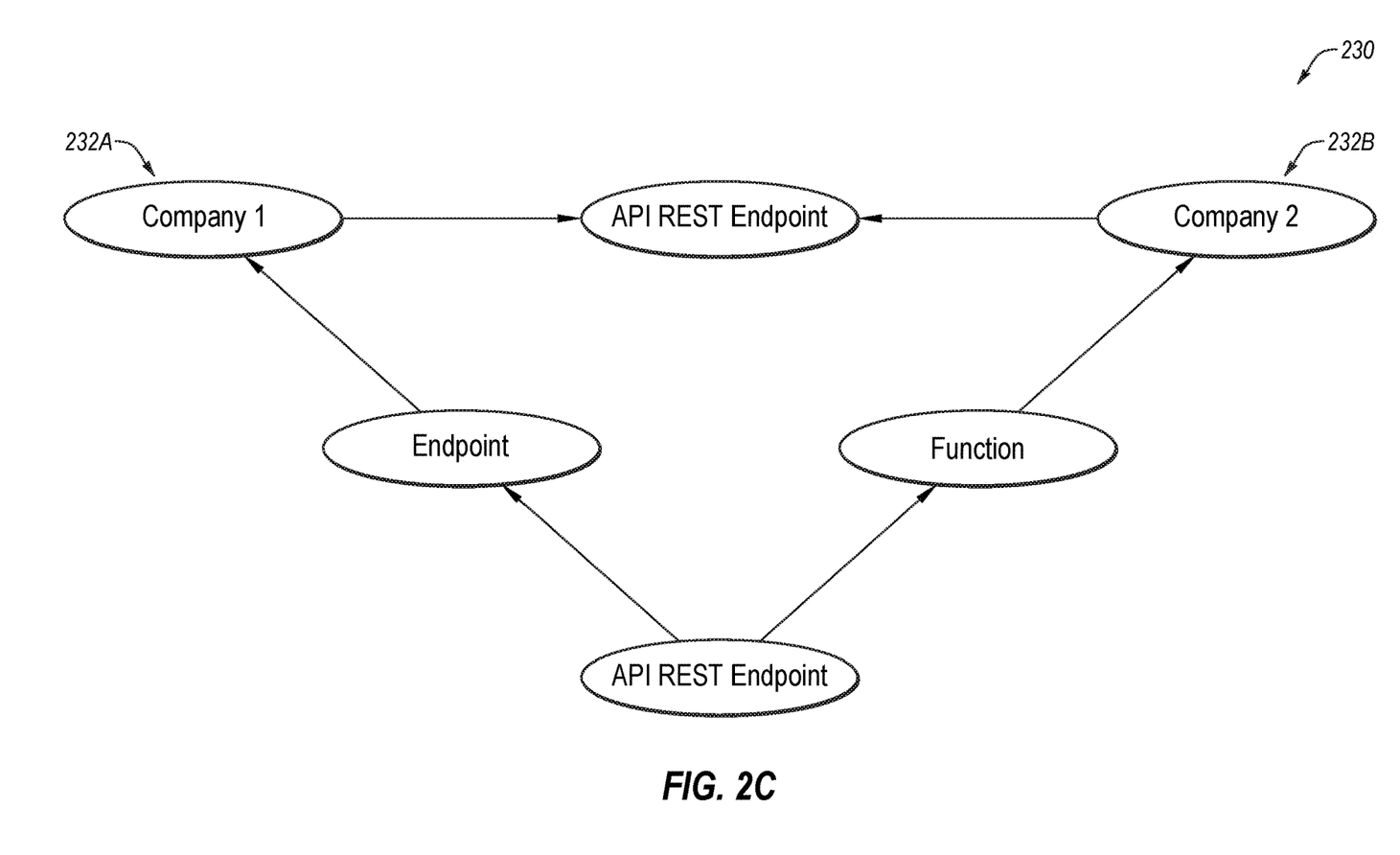

For example, the machine learning classifier 160 may be configured to classify objects into different but similar classes according to their features. For example, the machine learning classifier 160 may be configured to associate objects, properties, and/or classes from a first extended OAS ontology 155 with objects, properties, and/or classes from a second extended OAS ontology 155. For example, the machine learning classifier 160 may be configured to use classifications of words from the mining module 120, such as, for example, classifications of words from a Word2Vec unsupervised model, to identify which objects of a first extended OAS ontology 155 correlate with corresponding objects of a second extended OAS ontology 155. In these and other embodiments, the machine learning classifier 160 may connect nodes of the first extended OAS ontology 155 with nodes of the second extended OAS ontology 155 by adding additional nodes. For example, an "endpoint" in a first extended OAS ontology 155 may correspond with an API REST endpoint. A "function" in a second extended OAS ontology 155 may also correspond with an API REST endpoint. The machine learning classifier 160 may add an API REST endpoint node and connect the node to both the "endpoint" and the "function" nodes with the "endpoint" and "function" both being instances of an API REST endpoint. Thus, the machine learning classifier 160 may generate a knowledge graph 165 as depicted in FIGS. 2a-2c.

In some embodiments, one or more of the mining module 120, the instantiation module 140, the extension module 150, and the machine learning classifier 160 may be part of a single device. Alternatively or additionally, in some embodiments, one or more of the mining module 120, the instantiation module 140, the extension module 150, and the machine learning classifier 160 may be implemented as software. For example, one or more of the mining module 120, the instantiation module 140, the extension module 150, and the machine learning classifier 160 may be programmed as different modules in a software program.

A description of the operation of environment 100 follows. The mining module 120 may obtain a corpus of API documentation 110. The mining module 120 may perform supervised and/or unsupervised machine learning on the corpus of API documentation 110 to identify and/or extract RDF triples from the corpus of API documentation 110 as the objects 125. In some embodiments, the mining module 120 may select a subset of the objects 125 based on a frequency of occurrence of respective predicates in respective triples associated with the objects 125. For example, the mining module 120 may determine that a particular predicate occurs in 20% of the API documentation of the corpus of API documentation 110 and may not include triples including the particular predicate in the objects 125. Alternatively or additionally, the mining module 120 may determine that a different particular predicate occurs in 85% of the API documentation of the corpus of API documentation 110 and may include triples including the particular predicate in the objects 125. The instantiation module 140 may obtain the objects 125 and may obtain one or more OAS associated with APIs from an OAS repository. The instantiation module 140 may generate instances 145 of the objects 125.

The extension module 150 may extend an OAS ontology based on the objects 125 and the instances 145. In some embodiments, the OAS ontology may correspond with an OAS from the OAS repository 130. In some embodiments, extension module 150 may add additional properties to the OAS ontology based on particular classes in the OAS ontology, may add instances 145 to the OAS ontology, and may add objects 125 to the OAS ontology. In some embodiments, the extension module 150 may add infer classes of instances based on an associated OAS, may extend the OAS ontology based on the Swagger ontology and/or based on other ontologies, may add additional classes to the OAS ontology, and/or may modify classes by adding new properties to the classes to reduce redundancy. In some embodiments, the machine learning classifier 160 may generate the knowledge graph 165 based on the extended OAS ontology 155. For example, in some embodiments, the machine learning classifier 160 may correlate two or more extended OAS ontologies 155 to generate the knowledge graph 165. Examples of knowledge graphs 165 and/or examples of snippets of knowledge graphs 165 are depicted in FIGS. 2a-2c.

The knowledge graph 165 may be used to answer users' queries and/or to present information about multiple APIs at once to a user to allow a user to understand how different APIs are structured, to determine similarities between different APIs, and/or to understand how to use different APIs. For example, the knowledge graph 165 may link objects of a first API with objects of a second API even if the first API and the second API refer to the objects differently. For example, the first API may refer to an object as an "endpoint" and a second API may refer to an object as a "function" but both the "endpoint" and the "function" may be associated with and/or operate as am API REST endpoint. In this manner, the knowledge graph 165 may allow a user to understand two different terminologies that may be used to refer to equivalent and/or similar information.

Additionally, in some embodiments, a knowledge graph 165 may be used to provide resolutions to user queries. For example, a user query may be received in a natural language. In some embodiments, the user query may be in text form, in audio form, or in video form. A machine learning algorithm may use natural language understanding to generate a SPARQL query. In some embodiments, the machine learning algorithm may identify a context of the user's query. As an example, if the query requests "get temperature of Sunnyvale", the machine learning algorithm may identify the context as "weather" from the word "temperature" and may identify a location as "city" from "Sunnyvale." The SPARQL query may then be executed on the knowledge graph 165 and an appropriate API call may be identified in the knowledge graph 165. The API call may be executed and a response to the user query may be identified. The machine learning algorithm may then perform an API call after identifying an appropriate API call in the knowledge graph to determine the weather in the city Sunnyvale and may respond to the user query with the weather. Additionally, user queries may involve the structure and/or functioning of the APIs themselves. For example, a user query may ask what the output is of a particular function. Additional details regarding the creation of a SPARQL query from a natural language query are described below relative to FIG. 3.

Modifications, additions, or omissions may be made to FIG. 1 without departing from the scope of the present disclosure. For example, the environment 100 may include more or fewer elements than those illustrated and described in the present disclosure. Moreover, in some embodiments, the mining module 120, the instantiation module 140, the extension module 150, and/or the machine learning module 160 may be one module. Alternatively or additionally, in some embodiments, the mining module 120, the instantiation module 140, the extension module 150, and/or the machine learning module 160 and the operations discussed relative to the mining module 120, the instantiation module 140, the extension module 150, and/or the machine learning module 160 may be distributed across different systems.

FIGS. 2a-2c illustrate example API knowledge graphs and/or snippets of API knowledge graphs. For example, FIG. 2a depicts a first example knowledge graph 210. As depicted in FIG. 2a, the knowledge graph 210 may include at least three types of nodes. For example, the knowledge graph 210 may include multiple regular nodes 212 (the nodes labeled "R" in FIG. 2a). Regular nodes may include nodes which are added to the knowledge graph 210 according to an OAS format. For example, "API Title: Twitter API" may be associated with a regular node 212 "Twitter API" and an edge "API Title." The knowledge graph 210 may also include multiple OAS ontology nodes 214 (the nodes labeled "O" in FIG. 2a). The OAS ontology nodes 214 may be nodes generated and/or associated with the ontology from an OAS as the OAS is received from an OAS repository, such as the OAS repository 130 of FIG. 1. The knowledge graph 210 may also include multiple extended OAS ontology nodes 216 (the nodes labeled "E" in FIG. 2a). In these and other embodiments, the extended OAS ontology nodes 216 may include nodes generated based on objects and instances such as the objects 125 and the instances 145 of FIG. 1. In these and other embodiments, the extended OAS ontology nodes 216 may also include nodes added based on objects with extensible properties. For example, new properties of an object with extensible properties may be added as new nodes as described above relative to FIG. 1. Additionally or alternatively, extended OAS ontology nodes 216 may include nodes added as an inference of a class associated with an instance. For example, an instance may be an extended OAS ontology node 216 and an inferred class node may also be an extended OAS ontology node 216. Additionally or alternatively, extended OAS ontology nodes 216 may include nodes added as new properties to particular classes.

FIG. 2b depicts a second example knowledge graph 220. As depicted in FIG. 2b, the knowledge graph 220 may represent multiple APIs such as the API 1 222A and the API 2 222B. In these and other embodiments, the knowledge graph 220 may represent only a snippet of a larger knowledge graph. For example, the larger knowledge graph may include additional nodes associated with the API 1 222A and/or additional nodes associated with the API 2 222B. In some embodiments, the knowledge graph 220 may identify similar nodes between multiple APIs. For example, the class node 224A may be a class in the API 1 222A and the class node 224B may be a class in the API 2 222B. Each of the class node 224A and the class node 222B may be instances of the Swagger object 226. Thus, the knowledge graph 220 may depict to a user, such as a computer programmer, than the class 224A in the API 1 222A is similar and/or identical to the class 224B in the API 2 222B even if the class 224A and the class 224B have different names and/or descriptions in the API 1 222A and the API 2 222B and the associated API documentation.

FIG. 2c depicts a third example knowledge graph 230. As depicted in FIG. 2c, the knowledge graph 230 may include APIs from multiple different API providers, such as an API from a company 1 232A and an API from a company 2 232B. APIs from company 1 232A may refer to particular objects as "endpoints" while APIs from company 2 may refer to particular objects as "functions." The knowledge graph 230 may indicate that "endpoints" and "functions" both are instances of API REST endpoints, helping a user understand the functioning of both APIs from company 1 232A and APIs from company 2 232B.

Modifications, additions, or omissions may be made to FIGS. 2a-2c without departing from the scope of the present disclosure. For example, the knowledge graphs 210, 220, and 230 of FIGS. 2a, 2b, and 2c, respectively, are only exemplary. Each of the knowledge graphs may include more nodes, fewer nodes, and/or be associated with multiple (e.g., tens, hundreds, thousands, and/or more APIs).

Figure 3:
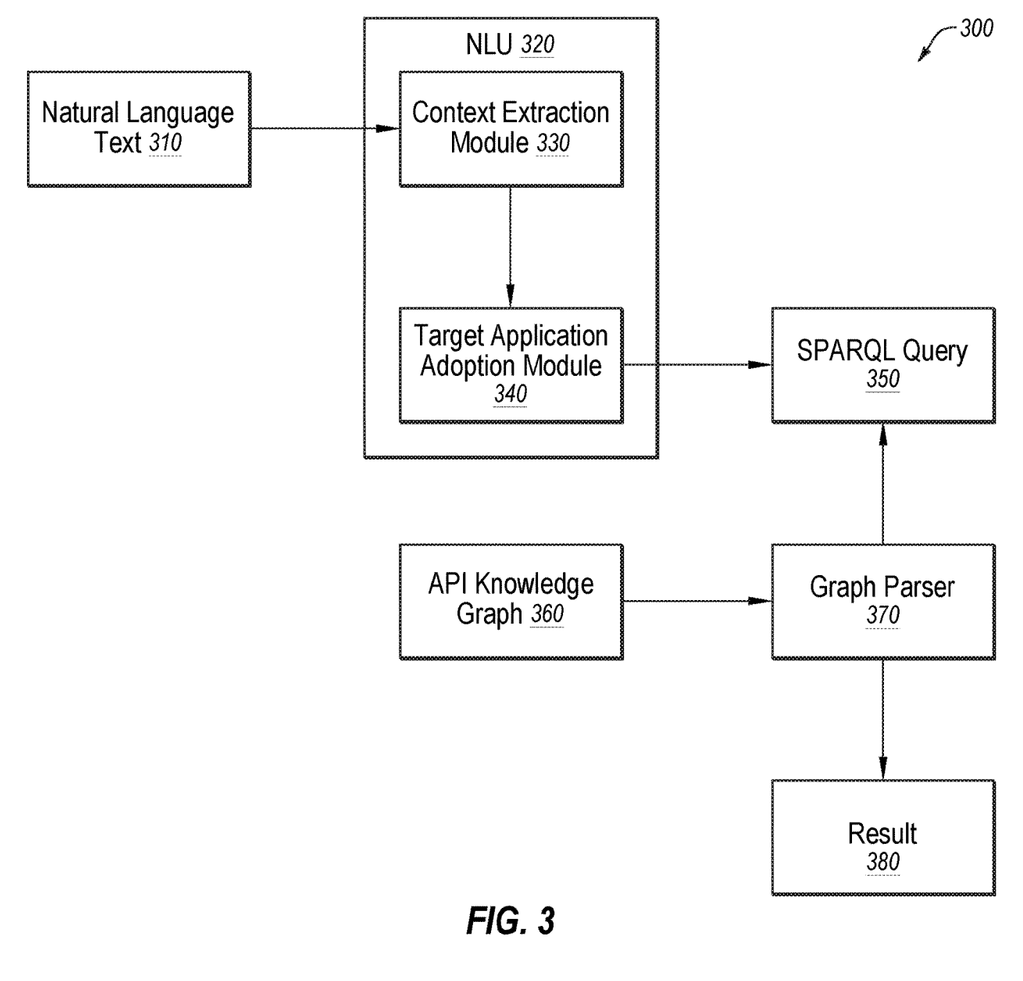
FIG. 3 is a flowchart of an example process of using natural language processing to identify results in an API knowledge graph.

FIG. 3 is a flowchart of an example process 300 of using natural language processing to identify results in an API knowledge graph. The process 300 may include a natural language understanding unit (NLU) 320 and a graph parser 370.

The NLU 320 may include code and routines configured to enable a computing device to perform one or more operations with respect to a natural language text 310 to obtain a SPARQL query 350. Additionally or alternatively, the NLU 320 may be implemented using hardware including a processor, a microprocessor (e.g., to perform or control performance of one or more operations), a field-programmable gate array (FPGA), or an application-specific integrated circuit (ASIC). In some other instances, the NLU 320 may be implemented using a combination of hardware and software. In the present disclosure, operations described as being performed by the NLU 320 may include operations that the NLU 320 may direct a corresponding system to perform.

The natural language text 310 may include a query or question in a natural language format. For example, the natural language text 310 may include a question in English, in Spanish, in Japanese, or in any other language. In some embodiments, the natural language text 310 may include audio of an individual asking a question or making a statement or request. Additionally or alternatively, the natural language text 310 may include a text representation of audio. For example, the natural language text 310 may include a question such as "What is the output of GET statuses/home timeline?" Alternatively or additionally, the natural language text 310 may include a request such as "Tell me the current temperature in Sunnyvale."

The NLU 320 may use a context extraction module 330 to parse the natural language text 310 to identify different elements and/or topics of the natural language text 310. Continuing the above examples, the context extraction module 330 may analyze the request "Tell me the current temperature in Sunnyvale" and determine that the context of the inquiry is "weather" based on the word "temperature" and determine the geographic location associated with the inquiry is a "city" named "Sunnyvale."

After the context extraction module 330 identifies the elements and contexts associated with the natural language text 330, the target application adoption module 340 may the elements and contexts to a SPARQL query. For example, the "weather" context identified by the context extraction module 330 may be adopted to a "weather topic" in SPARQL. Similarly, the "city" context may be adopted to a "location topic." The NLU 320 may thus generate a SPARQL query 350 from the natural language text 310.

The graph parser 370 may include code and routines configured to enable a computing device to perform one or more operations with respect to the SPARQL query 350 and an API knowledge graph 360 to obtain a result 380. Additionally or alternatively, the graph parser 370 may be implemented using hardware including a processor, a microprocessor (e.g., to perform or control performance of one or more operations), a field-programmable gate array (FPGA), or an application-specific integrated circuit (ASIC). In some other instances, the NLU 320 may be implemented using a combination of hardware and software. In the present disclosure, operations described as being performed by the graph parser 370 may include operations that the graph parser 370 may direct a corresponding system to perform.

The API knowledge graph 360 may be an API knowledge graph as described above relative to FIGS. 1 and 2a-2c. The API knowledge graph 360 may include multiple nodes associated with multiple APIs. The graph parser 370 may parse the nodes of the API knowledge graph 360 based on the SPARQL query 350 to identify a result 380 in response to the natural language text 310. For example, the graph parser 370 may identify a relevant API and an associated function and/or call of the API using the API knowledge graph 360. The graph parser 370 may execute the call of the API using the SPARQL query 350 to generate the result 380. For example, continuing the above, the graph parser 370 may execute an API call to determine the temperature and/or weather in the city Sunnyvale. The graph parser 370 may then return the result of executing the call as the result 380.

Alternatively or additionally, in some embodiments, the natural language text 310 may be associated with the nature and/or structure of the API knowledge graph 360 itself. For example, the natural language text 310 may be a query asking what type of output a particular function returns and/or what variables and/or terminologies correspond between two different APIs.

Modifications, additions, or omissions may be made to the process 300 without departing from the scope of the present disclosure. For example, in some embodiments, the process 300 may include any number of other components that may not be explicitly illustrated or described.

Figure 4:
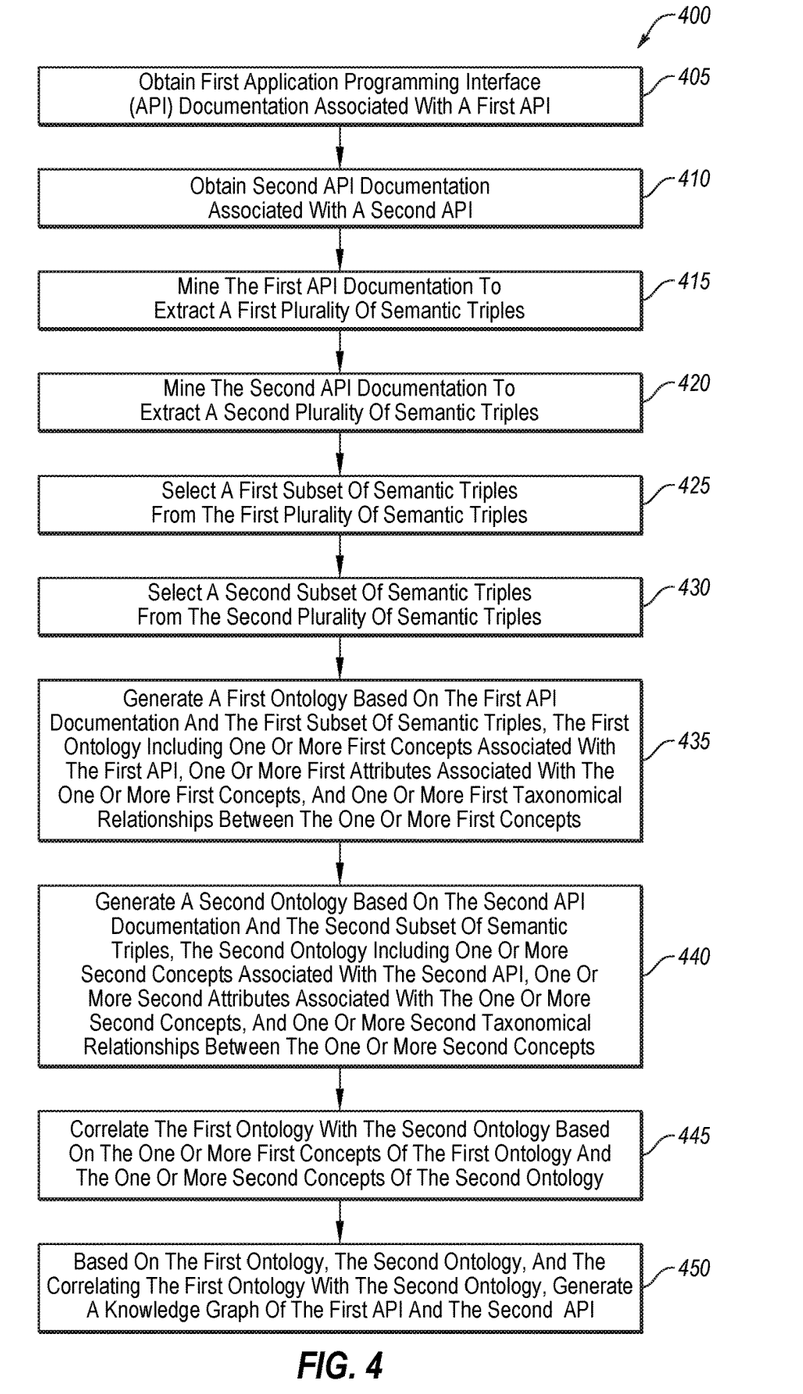
FIG. 4 is a flowchart of an example method of generating an API knowledge graph.

FIG. 4 is a flowchart of an example method of generating an API knowledge graph. The method 400 may be arranged in accordance with at least one embodiment described in the present disclosure. The method 400 may be performed, in whole or in part, in some embodiments, by a system and/or environment, such as the environment 100 and/or the computer system 502 of FIGS. 1 and 5, respectively. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method may begin at block 405, where first application programming interface (API) documentation associated with a first API may be obtained. In some embodiments, the first API documentation may be unstructured or semi-structured information. In block 410, second API documentation associated with a second API may be obtained. In block 415, the first API documentation may be mined to extract a first plurality of semantic triples. In some embodiments, each semantic triple of the first plurality of semantic triples may include a subject, a predicate and an object. In block 420, the second API documentation may be mined to extract a second plurality of semantic triples. In block 425, a first subset of semantic triples may be selected from the first plurality of semantic triples. In some embodiments, the first subset of semantic triples may be selected based on a frequency of occurrence in the first API documentation and the second API documentation of a respective predicate of a respective semantic triple. In some embodiments, the first subset of semantic triples may be selected in response to a frequency of occurrence in the first API documentation and the second API documentation of a respective predicate of a respective semantic triple satisfying a first threshold. In block 430, a second subset of semantic triples may be selected from the second plurality of semantic triples.

In block 435, a first ontology may be generated based on the first API documentation and the first subset of semantic triples. The first ontology may include one or more first concepts associated with the first API, one or more first attributes associated with the one or more first concepts, and one or more first taxonomical relationships between the one or more first concepts.

In block 440, a second ontology may be generated based on the second API documentation and the second subset of semantic triples. The second ontology may include one or more second concepts associated with the second API, one or more second attributes associated with the one or more second concepts, and one or more second taxonomical relationships between the one or more second concepts.

In block 445, the first ontology may be correlated with the second ontology based on the one or more first concepts of the first ontology and the one or more second concepts of the second ontology. In some embodiments, the first ontology may be correlated with the second ontology using an unsupervised learning process to find similarities between the one or more first concepts and the one or more second concepts. In block 450, a knowledge graph of the first API and the second API may be generated based on the first ontology, the second ontology, and the correlating the first ontology with the second ontology.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. In some embodiments, the method 400 may include additional blocks or fewer blocks.

For example, in some embodiments, the semantic triples of the first subset of semantic triples may be selected as first objects and the semantic triples of the second subset of semantic triples may be selected as second objects. In these and other embodiments, the method 400 may include obtaining a first open API specification (OAS) associated with the first API. The first ontology may be further based on the first OAS. The method 400 may include obtaining a second OAS associated with the second API. The second ontology may be further based on the second OAS. The method 400 may include generating first instances of the first objects using the first OAS. The first instances may be examples of respective first objects. The method 400 may include generating second instances of the second objects using the second OAS. The second instances may be examples of respective second objects. In these and other embodiments, generating the knowledge graph of the first API and the second API may include generating the knowledge graph based on the first ontology, the second ontology, the first instances, the second instances, and the correlating the first ontology with the second ontology.

Alternatively or additionally, in some embodiments, the method 400 may include obtaining a natural language user query from a user. The method 400 may include converting the natural language user query to a semantic user query using natural language understanding. The method 400 may include searching the knowledge graph using the semantic user query to identify an API call as a response to the natural language query. The method 400 may include executing the API call using the knowledge graph and the natural language user query to provide a result for the natural language user query. The method 400 may include providing the result to the user.

Figure 5:
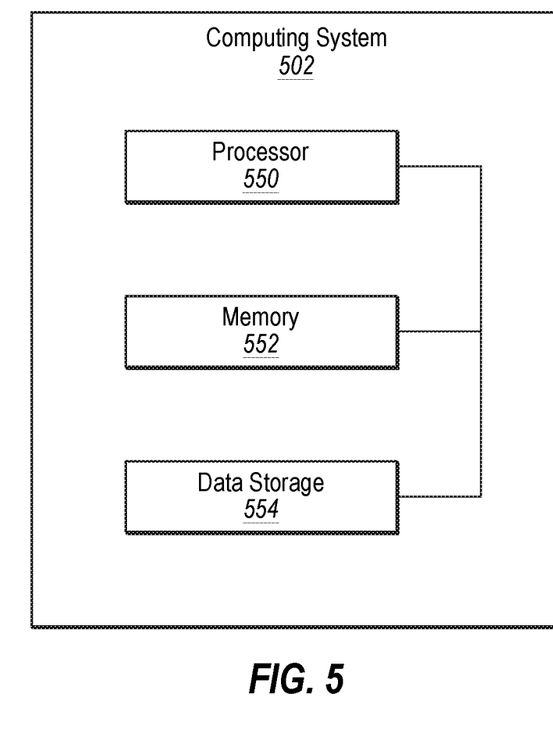
FIG. 5 illustrates an example computing system that may be configured to generate an API knowledge graph.

FIG. 5 illustrates a block diagram of an example computing system 502, according to at least one embodiment of the present disclosure. The computing system 502 may be configured to implement or direct one or more operations associated with generating API knowledge graphs. The computing system 502 may include a processor 550, a memory 552, and a data storage 554. The processor 550, the memory 552, and the data storage 554 may be communicatively coupled.

In general, the processor 550 may include any suitable special-purpose or general-purpose computer, computing entity, or processing device including various computer hardware or software modules and may be configured to execute instructions stored on any applicable computer-readable storage media. For example, the processor 550 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 5, the processor 550 may include any number of processors configured to, individually or collectively, perform or direct performance of any number of operations described in the present disclosure. Additionally, one or more of the processors may be present on one or more different electronic devices, such as different servers.

In some embodiments, the processor 550 may be configured to interpret and/or execute program instructions and/or process data stored in the memory 552, the data storage 554, or the memory 552 and the data storage 554. In some embodiments, the processor 550 may fetch program instructions from the data storage 554 and load the program instructions in the memory 552. After the program instructions are loaded into memory 552, the processor 550 may execute the program instructions.

For example, in some embodiments, the method 400 of FIG. 4 may be included in the data storage 554 as program instructions. The processor 550 may fetch the program instructions of the methods from the data storage 554 and may load the program instructions of the methods in the memory 552. After the program instructions of the methods are loaded into memory 552, the processor 550 may execute the program instructions such that the computing system may implement the operations associated with the methods as directed by the instructions.

The memory 552 and the data storage 554 may include computer-readable storage media for carrying or having computer-executable instructions or data structures stored thereon. Such computer-readable storage media may include any available media that may be accessed by a general-purpose or special-purpose computer, such as the processor 550. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 550 to perform a certain operation or group of operations.

Modifications, additions, or omissions may be made to the computing system 502 without departing from the scope of the present disclosure. For example, in some embodiments, the computing system 502 may include any number of other components that may not be explicitly illustrated or described.

As indicated above, the embodiments described in the present disclosure may include the use of a special-purpose or general-purpose computer (e.g., the processor 550 of FIG. 5) including various computer hardware or software modules, as discussed in greater detail below. Further, as indicated above, embodiments described in the present disclosure may be implemented using computer-readable media (e.g., the memory 552 or data storage 554 of FIG. 5) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

The invention claimed is:

1. A method comprising:
   obtaining first application programming interface (API) documentation associated with a first API;
   obtaining second API documentation associated with a second API;
   mining the first API documentation to extract a first plurality of semantic triples;
   mining the second API documentation to extract a second plurality of semantic triples;
   selecting a first subset of semantic triples from the first plurality of semantic triples;
   selecting a second subset of semantic triples from the second plurality of semantic triples;
   generating a first ontology based on the first API documentation and the first subset of semantic triples, the first ontology including one or more first concepts associated with the first API, one or more first attributes associated with the one or more first concepts, and one or more first taxonomical relationships between the one or more first concepts;
   generating a second ontology based on the second API documentation and the second subset of semantic triples, the second ontology including one or more second concepts associated with the second API, one or more second attributes associated with the one or more second concepts, and one or more second taxonomical relationships between the one or more second concepts;
   correlating the first ontology with the second ontology based on the one or more first concepts of the first ontology and the one or more second concepts of the second ontology;
   based on the first ontology, the second ontology, and the correlating the first ontology with the second ontology, generating a knowledge graph of the first API and the second API;
   obtaining a natural language user query provided by a user;
   converting the natural language user query to a semantic user query using natural language understanding;
   searching the knowledge graph using the semantic user query to identify an API call as a response to the natural language user query;
   executing the API call using the knowledge graph and the natural language user query to provide a result for the natural language user query; and
   providing the result to the user.

2. The method of claim 1, wherein the semantic triples of the first subset of semantic triples are selected as first objects and the semantic triples of the second subset of semantic triples are selected as second objects, further comprising:
   obtaining a first open API specification (OAS) associated with the first API and wherein the first ontology is further based on the first OAS;
   obtaining a second OAS associated with the second API and wherein the second ontology is further based on the second OAS;
   using the first OAS, generating first instances of the first objects, the first instances being examples of respective first objects; and
   using the second OAS, generating second instances of the second objects, the second instances being examples of respective second objects,
   wherein the generating the knowledge graph of the first API and the second API comprises generating the knowledge graph of the first API and the second API based on the first ontology, the second ontology, the first instances, the second instances, and the correlating the first ontology with the second ontology.

3. The method of claim 1, wherein each semantic triple of the first plurality of semantic triples includes a subject, a predicate and an object and wherein selecting the first subset of semantic triples from the first plurality of semantic triples comprises selecting the first subset of semantic triples based on a frequency of occurrence in the first API documentation and the second API documentation of a respective predicate of a respective semantic triple.

4. The method of claim 3, wherein the selecting the first subset of semantic triples comprises selecting the first subset of semantic triples in response to a frequency of occurrence in the first API documentation and the second API documentation of a respective predicate of a respective semantic triple satisfying a first threshold.

5. The method of claim 1, wherein the correlating the first ontology with the second ontology comprises using an unsupervised learning process to find similarities between the one or more first concepts and the one or more second concepts.

6. The method of claim 1, wherein the first API documentation is unstructured or semi-structured information.

7. A non-transitory computer-readable medium having encoded therein programming code executable by a processor to perform operations comprising:
   obtaining first application programming interface (API) documentation associated with a first API;
   obtaining second API documentation associated with a second API;
   mining the first API documentation to extract a first plurality of semantic triples;
   mining the second API documentation to extract a second plurality of semantic triples;
   selecting a first subset of semantic triples from the first plurality of semantic triples;

selecting a second subset of semantic triples from the second plurality of semantic triples;

generating a first ontology based on the first API documentation and the first subset of semantic triples, the first ontology including one or more first concepts associated with the first API, one or more first attributes associated with the one or more first concepts, and one or more first taxonomical relationships between the one or more first concepts;

generating a second ontology based on the second API documentation and the second subset of semantic triples, the second ontology including one or more second concepts associated with the second API, one or more second attributes associated with the one or more second concepts, and one or more second taxonomical relationships between the one or more second concepts;

correlating the first ontology with the second ontology based on the one or more first concepts of the first ontology and the one or more second concepts of the second ontology;

based on the first ontology, the second ontology, and the correlating the first ontology with the second ontology, generating a knowledge graph of the first API and the second API;

obtaining a natural language user query provided by a user;

converting the natural language user query to a semantic user query using natural language understanding;

searching the knowledge graph using the semantic user query to identify an API call as a response to the natural language user query;

executing the API call using the knowledge graph and the natural language user query to provide a result for the natural language user query; and providing the result to the user.

8. The non-transitory computer-readable medium of claim 7, wherein the semantic triples of the first subset of semantic triples are selected as first objects and the semantic triples of the second subset of semantic triples are selected as second objects and wherein the operations further comprise:

obtaining a first open API specification (OAS) associated with the first API and wherein the first ontology is further based on the first OAS;

obtaining a second OAS associated with the second API and wherein the second ontology is further based on the second OAS;

using the first OAS, generating first instances of the first objects, the first instances being examples of respective first objects; and using the second OAS, generating second instances of the second objects, the second instances being examples of respective second objects, wherein the generating the knowledge graph of the first API and the second API comprises generating the knowledge graph of the first API and the second API based on the first ontology, the second ontology, the first instances, the second instances, and the correlating the first ontology with the second ontology.

9. The non-transitory computer-readable medium of claim 7, wherein each semantic triple of the first plurality of semantic triples includes a subject, a predicate and an object and wherein selecting the first subset of semantic triples from the first plurality of semantic triples comprises selecting the first subset of semantic triples based on a frequency of occurrence in the first API documentation and the second API documentation of a respective predicate of a respective semantic triple.

10. The non-transitory computer-readable medium of claim 9, wherein the selecting the first subset of semantic triples comprises selecting the first subset of semantic triples in response to a frequency of occurrence in the first API documentation and the second API documentation of a respective predicate of a respective semantic triple satisfying a first threshold.

11. The non-transitory computer-readable medium of claim 7, wherein the correlating the first ontology with the second ontology comprises using an unsupervised learning process to find similarities between the one or more first concepts and the one or more second concepts.

12. The non-transitory computer-readable medium of claim 7, wherein the first API documentation is unstructured or semi-structured information.

13. A system comprising:
one or more processors; and
one or more computer-readable media configured to store instructions that in response to being executed by the one or more processors cause the system to perform operations, the operations comprising:

obtaining first application programming interface (API) documentation associated with a first API;

obtaining second API documentation associated with a second API;

mining the first API documentation to extract a first plurality of semantic triples;

mining the second API documentation to extract a second plurality of semantic triples;

selecting a first subset of semantic triples from the first plurality of semantic triples;

selecting a second subset of semantic triples from the second plurality of semantic triples;

generating a first ontology based on the first API documentation and the first subset of semantic triples, the first ontology including one or more first concepts associated with the first API, one or more first attributes associated with the one or more first concepts, and one or more first taxonomical relationships between the one or more first concepts;

generating a second ontology based on the second API documentation and the second subset of semantic triples, the second ontology including one or more second concepts associated with the second API, one or more second attributes associated with the one or more second concepts, and one or more second taxonomical relationships between the one or more second concepts;

correlating the first ontology with the second ontology based on the one or more first concepts of the first ontology and the one or more second concepts of the second ontology;

based on the first ontology, the second ontology, and the correlating the first ontology with the second ontology, generating a knowledge graph of the first API and the second API;

obtaining a natural language user query provided by a user;

converting the natural language user query to a semantic user query using natural language understanding;

searching the knowledge graph using the semantic user query to identify an API call as a response to the natural language user query;

executing the API call using the knowledge graph and the natural language user query to provide a result for the natural language user query; and providing the result to the user.

14. The system of claim 13, wherein the semantic triples of the first subset of semantic triples are selected as first objects and the semantic triples of the second subset of semantic triples are selected as second objects and wherein the operations further comprise:
- obtaining a first open API specification (OAS) associated with the first API and wherein the first ontology is further based on the first OAS;
- obtaining a second OAS associated with the second API and wherein the second ontology is further based on the second OAS;
- using the first OAS, generating first instances of the first objects, the first instances being examples of respective first objects; and
- using the second OAS, generating second instances of the second objects, the second instances being examples of respective second objects,
- wherein the generating the knowledge graph of the first API and the second API comprises generating the knowledge graph of the first API and the second API based on the first ontology, the second ontology, the first instances, the second instances, and the correlating the first ontology with the second ontology.

15. The system of claim 13, wherein each semantic triple of the first plurality of semantic triples includes a subject, a predicate and an object and wherein selecting the first subset of semantic triples from the first plurality of semantic triples comprises selecting the first subset of semantic triples based on a frequency of occurrence in the first API documentation and the second API documentation of a respective predicate of a respective semantic triple.

16. The system of claim 15, wherein the selecting the first subset of semantic triples comprises selecting the first subset of semantic triples in response to a frequency of occurrence in the first API documentation and the second API documentation of a respective predicate of a respective semantic triple satisfying a first threshold.

17. The system of claim 13, wherein the correlating the first ontology with the second ontology comprises using an unsupervised learning process to find similarities between the one or more first concepts and the one or more second concepts.

* * * * *